2,880,082

METHOD AND COMPOSITION FOR THE CONTROL OF UNDESIRED VEGETATION

Burton V. Toornman, Scotts, Mich., assignor to The Dow Chemical Company, Midland, Mich., a corporation of Delaware No Drawing. Application March 16, 1956
Serial No. 571,883

11 Claims. (Cl. 71—2.7)

This invention relates to herbicides and is particularly directed to a composition and method for the suppression of the growth of germinant seeds and undesirable vegetation.

The use of chemical materials for the control of vegetated growth has found wide spread acceptance with agriculturalists in recent years. However, the practice of such control measures has brought into focus shortcomings in commonly recommended procedures. Thus, many of the conventional materials, when applied to the aerial portions of the vegetation, selectively control only certain types of vegetation. The resulting partial denuding of the soil encourages the invasion of unsusceptible species in the space so provided. Still others accomplish only a top kill with the regrowth from unaffected roots bringing about a more severe infestation than existed prior to treatment. Many of the materials heretofore proposed for treating soil are extremely persistent and produce a sterilization of soil for periods of many months. When employing such materials at recommended dosages, the treated soil must be fallowed and left idle during a subsequent planting season to await the disappearance of toxic residues. Others of the currently recommended materials have a property of producing only a transistory effect and disappear from the soil in a few days. Procedures wherein the latter materials are employed give inadequate vegetative control. For example, such procedures fail to control seedlings which germinate several days following soil treatment and arising from seeds below the depth of toxicant distribution. Thus, it is apparent that herbicide materials having intermediate persistence and which would permit the soil to be planted and cropped during the season in which the control is desired, would be of outstanding value to the agriculturist.

It is an object of the present invention to provide a new method for the suppression and control of the growth of undesirable vegetation. Another object is to provide a method for the control of the growth of germinant seeds and emerging seedlings. A further object is the provision of a method for the control of vegetative growth which requires the employment of small amounts of toxicant compound. Another object is the provision of a method wherein a single soil application gives a very desirable residual control of plant growth and permits the treated soil to be planted and cropped during the same growing season in which the treatment is carried out. An additional object is the provision of novel compositions to be employed for the accomplishment of the new method of growth control. Other objects will become apparent from the following specification and claims.

According to the present invention, it has been discovered that the growth of plants may be suppressed by exposing a part of the growing plant to the action of 2,2-dichlorobutyric acid or its salts. More particularly, it has been discovered that the growth of germinant seeds, emerging seedlings, and established vegetation may be controlled by exposing the seeds, emerging seedlings, or the roots or above ground portions of established vegetation to the action of a growth inhibiting amount of 2,2-dichlorobutyric acid or its salts. Moreover, it has been found that these compounds have a high degree of toxicity to plants and plant parts and are adapted to accomplish good controls of growth at very low concentrations of toxicant compound. Further, the compounds have a very desirable and beneficial degree of persistence in soil whereby the soil may be treated to obtain the advantage of an improved weed control together with being able to plant and crop the treated soil during the same growing season in which the treatment is carried out.

The exposure of plants to the action of 2,2-dichlorobutyric acid and its salts give rise to varying degrees of response in germinant seeds, emerging seedlings, and growing plants depending upon the form and nature of the plant part contacted, the stage of growth or maturity of the plant, and the dosage of the toxicant compound employed. When extremely large dosages are dispersed in soil, a persistent inhibition of the growth of seeds, emerging seedlings, and established plants is obtained. Soil applications of more dilute dosages suppress the vegetative growth for periods of from three to eight weeks. The growth media is possibly freed of the toxicant by the weathering action of the sun, the rain and perhaps the decomposition of the toxicant compounds by the action of microorganisms. The application of the butyric acid compound to the foliage of established vegetation suppresses the growth of the treated plants and effects a substantial denuding of the soil.

The exposure of the plant or plant part to the action of a growth inhibiting amount of 2,2-dichlorobutyric acid or its salts is essential and critical for the practice of the present invention. In foliar treatments for the control of vegetative growth, good results are obtained when one or more pounds of acid equivalent of 2,2-dichlorobutyric acid is applied per acre. In applications to soil for the control of germinant seeds, emerging seedlings and established vegetation good results are obtained when the toxicant compounds are distributed in the soil at a concentration of at least 1 part by weight acid equivalent of 2,2-dichlorobutyric acid per million parts by weight of soil. In such applications, it is desirable that the compounds be distributed to a depth of at least 0.3 inch and preferably at a dosage of 0.3 pound per acre inch.

Methods and compositions employing the water soluble salts of 2,2-dichlorobutyric acid comprise a preferred embodiment of the present invention.

The method of the present invention may be carried out by distributing the unmodified 2,2-dichlorobutyric acid and its salts in growth media or upon the surfaces of the above ground portion of plants. However, the present method also embraces the employment of liquid or dust compositions containing the toxicants. In such usage, the toxicant compounds may be modified with one or a plurality of additaments or herbicide adjuvants including water or other liquid carriers, surface active dispersing agents and finely divided inert solids. Depending upon the concentration of toxicant, such augmented compositions are adapted to be distributed in soil or upon the above ground surfaces of plants, or to be employed as concentrates and subsequently diluted with additional inert carrier to produce the ultimate treating compositions.

The exact concentration of the 2,2-dichlorobutyric acid or its salts to be employed in the treating compositions is not critical and may vary considerably provided the required dosage of effective agent is supplied in the growth medium or upon the plant foliage. The concentration of toxicant in liquid compositions employed to supply the desired dosage generally is from about 0.001 to 50 percent by weight although concentrations as high as 90 percent by weight are sometimes employed. In dusts, the concentration of toxicant may be from about 0.1 to 20 percent by weight. In compositions to be employed as concentrates, the toxicants may be present in a concentration of from 5 to 95 percent by weight.

The quantity of treating compositions to be applied may vary considerably provided that the required dosage of active ingredient is applied in a sufficient amount of the finished composition to cover adequately the vegetation to be treated or to facilitate the penetration and distribution of said ingredient in growth media. The required amount of the active ingredient in the soil conveniently may be supplied per acre treated in from 10 to 27,000 gallons or more of the liquid carrier or in from 50 to 2,000 pounds of the inert solid carrier. In the treatment of seedling weeds, good coverage is obtained when using from 10 to 60 gallons of finished spray composition per acre. Where large succulent vegetation is concerned, it is frequently desirable to employ up to 250 gallons or more of the finished spray composition per acre to assure complete coverage of the above ground portion of the vegetation. In the application of dusts to plant foliage, good results are obtained with from 40 to 200 pounds of finished dust per acre, the only requirement being that the required toxicant dosage be supplied in sufficient dust to achieve good coverage of the foliage.

Liquid compositions containing the desired amount of active ingredient may be prepared by dispersing the toxicants in water or an organic liquid, with or without the aid of a suitable surface active dispersing agent such as an ionic or non-ionic emulsifying agent. Suitable organic liquid carriers include the agricultural spray oils and the petroleum distillates such as diesel fuel, kerosene, fuel oil, naphthas and Stoddard solvent. Among the latter, the petroleum distillates boiling almost entirely under 400° F. at atmospheric pressure and having a flash point above 80° F. are generally preferred. The organic liquid compositions may contain a small amount of water as a solvent for the toxicant ingredient. In such compositions, the carrier comprises an oil emulsion, namely a mixture of water, emulsifying agent and organic liquid. In the liquid compositions, the choice of dispersing and emulsifying agent and the amount thereof employed is dictated by the nature of the composition and by the ability of the agent to facilitate the dispersion of the toxicant compounds in the carrier to produce the desired composition. Dispersing and emulsifying agents which may be employed in the compositions include the condensation products of alkylene oxides with phenols and organic acids, alkyl aryl sulfonates, polyoxyalkylene derivatives of sorbitan esters, complex ether alcohols, mahogany soaps and the like.

In the preparation of dust compositions, the active ingredient is dispersed in and on a finely divided inert solid such as clay, talc, chalk, gypsum and the like. In such operations, the finely divided carrier is mechanically mixed or ground with the 2,2-dichlorobutyric acid or its salts. Similarly, dust compositions containing the toxicant compounds may be prepared from various of the solid surface active dispersing agents such as bentonite, fuller's earth, attapulgite and other clays. Depending upon the proportion of ingredients, these dust compositions may be employed as concentrates and subsequently diluted with additional solid surface active dispersing agent or with chalk, talc or gypsum and the like to obtain the desired amount of active ingredient in a composition adapted to be employed for the suppression of the growth of plants. Also, such dust compositions may be dispersed in water, with or without the aid of a dispersing agent, to form spray mixtures.

When operating in accordance with the present invention, growth altering amounts of 2,2-dichlorobutyric acid or its salts are dispersed in soil or growth media in any convenient fashion. Applications to growth media may be carried out by simply mixing with the media, by applying to the surface of soil and thereafter dragging or discing into the soil to the desired depth, or by employing a liquid carrier to accomplish the penetration and impregnation. The application of spray and dust compositions to the surface of soil or to the above ground surfaces of plants may be carried out by conventional methods, e.g. power dusters, boom and hand sprayers and spray dusters.

In a further method, the distribution of the 2,2-dichlorobutyric acid or its salts in soil may be accomplished by introducing the toxicants in the water employed to irrigate the soil. In such procedures, the amount of water may be varied with the porosity and water holding capacity of the soil to obtain the desired depth of distribution of the toxicants.

The following examples illustrate the invention but are not to be construed as limiting:

*Example 1*

Twenty-five parts by weight of 2,2-dichlorobutyric acid, 10 parts of a dimeric aryl polyether alcohol (Triton X-155) and 65 parts of xylene were mechanically mixed together to produce a concentrate composition in the form of an emulsifiable liquid. A portion of this concentrate composition was dispersed in water to prepare an aqueous emulsion composition containing 0.4 pound of the butyric acid compound per hundred gallons of ultimate mixture. A portion of this aqueous emulsion was employed for the treatment of soil areas of sandy loam soil of good nutrient content. In such operations, the composition was applied to the soil areas as a soil drench and at a rate of 0.43 acre inch of aqueous composition per acre to supply a substantially uniform dosage of 50 pounds of 2,2-dichlorobutyric acid per acre. This dosage corresponds to a concentration of about 82 parts by weight of the butyric acid compound per million parts by weight of soil. Immediately prior to the applications, the soil areas had been prepared and seeded to Japanese millet, wild oats and radish. Other areas similarly prepared and seeded to the named plant species were left untreated to serve as checks.

After three weeks the treated areas were examined to ascertain what control of the growth of seeds and emerging seedlings had been obtained. As a result of the examination there was found a 100 percent control of Japanese millet and wild oats and a 70 percent control of radish. At the time of observation, the check areas were found to support luxuriant and vigorously growing stands of the named plant species.

*Example 2*

Sodium 2,2-dichlorobutyrate was dissolved in water to prepare aqueous compositions containing 0.058; 0.030 and 0.016 gram of 2,2-dichlorobutyric acid per liter of solution. These compositions were employed to treat soil areas which had been planted with the seeds of Japanese millet, wild oats, soybeans, German millet and crab grass. In such operations, the compositions were applied as a soil drench and at dosages of 8, 4, and 2 pounds of 2,2-dichlorobutyric acid per acre. These dosages correspond to concentrations of about 12, 6 and 3 parts by weight of 2,2-dichlorobutyric acid per million parts by weight of soil. Other areas similarly planted with the named seed species were left untreated to serve as checks. After three weeks the treated areas were examined to ascertain what control of the growth of the seeds and emerging seedlings had been obtained. The results are set forth in the following table:

| Dosage in Pounds Acid Equivalent per Acre | Percent Control of Growth of the Seeds and Emerging Seedlings | | | | |
|---|---|---|---|---|---|
| | Japanese Millet | Wild Oats | Soy- beans | German Millet | Crab Grass |
| 8 | 95 | 95 | 97 | 100 | 100 |
| 4 | 95 | 90 | 90 | 98 | 99 |
| 2 | 90 | 90 | 80 | 95 | 99 |

At the time of observation, abundant stands of the named plant species were found in the check areas.

Example 3

Sodium 2,2-dichlorobutyrate was dissolved in water to prepare an aqueous composition containing 0.57 gram of 2,2-dichlorobutyric acid per liter of solution. A portion of this composition was employed to treat seed beds of sandy loam soil of good nutrient content. In the treating operation, the aqueous composition was applied to the seed beds as a soil drench and at a dosage of about 0.43 acre inch of aqueous composition per acre to distribute 50 pounds acid equivalent of the butyrate compound per acre. This corresponds to a dosage of about 82 parts by weight of 2,2-dichlorobutyric acid per million parts by weight of soil. Following the application, the seed beds were watered every fourth day in an amount corresponding to about three acre inches per acre of rainfall per month.

Just prior to the applications, certain seed beds had been planted with seeds of corn, Japanese millet, wild oats and soybeans. Others of the treated seed beds were planted with the same named species at intervals of 1, 2, 3 etc., weeks following the treatments. In a check operation untreated seed beds of the same soil type were planted at the same intervals to the named plant species. Three weeks following each planting operation, the seed beds were examined to determine the percent control of the growth of germinant seeds and emerging seedlings. The results are set forth in the following table:

| Time of Planting expressed as Number of weeks after Treatment of Soil | Percent Control of the Growth of Germinant Seeds and Emerging Seedlings | | | |
|---|---|---|---|---|
| | Corn | Japanese Millet | Wild Oats | Soy- beans |
| 0 | 100 | 100 | 100 | 100 |
| 1 | 100 | 100 | 100 | 100 |
| 2 | 100 | 100 | 100 | 100 |
| 3 | 100 | 100 | 100 | 100 |
| 4 | 100 | 100 | 100 | 100 |
| 5 | 100 | 98 | 99 | 100 |
| 6 | 98 | 100 | 98 | 99 |
| 7 | 95 | 100 | 98 | 98 |
| 8 | 30 | 30 | 10 | 90 |
| 9 | 0 | 10 | 0 | 5 |

At the time of observations, the corresponding check plots were found to support lush and abundant stands of the named plant species.

Example 4

Sodium 2,2-dichlorobutyrate was dissolved in water to produce aqueous compositions containing 0.083 and 0.041 gram of 2,2-dichlorobutyric acid per liter of ultimate solution. These compositions were employed for the treatment of areas of soil which has been planted with various grass species and broadleaf plants. In the treating operations, the compositions were applied as a soil drench at a rate of about 0.4 acre inch of aqueous composition per acre to supply substantially uniform dosages of 8.2 and 4.1 pounds of 2,2-dichlorobutyrate per acre. These dosages correspond, respectively, to concentrations of about 13 and 6.5 parts by weight of 2,2-dichlorobutyric acid per million parts by weight of soil. Other areas similarly seeded with the various plant species were left untreated to serve as checks.

After three weeks the treated areas were examined and compared with the untreated areas to determine what percent control of the growth of germinant seeds and emerging seedlings has been obtained. The results are set forth in the following table:

| Seed Species | Dosage in Pounds of 2,2-Dichlorobutyric Acid per Acre | |
|---|---|---|
| | 4 | 2 |
| Lima bean | 100 | 100 |
| Cranberry bean | 100 | 100 |
| Navy bean | 100 | 100 |
| Soybean | 99 | 98 |
| Carrot | 100 | 95 |
| Celery | 100 | 100 |
| Chives | 100 | 100 |
| Ladino clover | 100 | 100 |
| Cucumber | 100 | 100 |
| Flax | 80 | 60 |
| Forget-me-not | 100 | 100 |
| Japanese millet | 100 | 100 |
| German millet | 100 | 100 |
| Proso millet | 100 | 100 |
| Morning glory | 100 | 80 |
| Giant mustard | 90 | 100 |
| Wild mustard | 100 | 100 |
| Onion | 90 | 80 |
| Pea | 95 | 100 |
| Pepper | 100 | 50 |
| Squash | 100 | 100 |
| Sunflower | 95 | 80 |
| Canada thistle | 100 | 90 |
| Turnip | 95 | 30 |
| Sweet corn | 95 | 80 |
| Bent grass | 100 | 100 |
| Bermuda grass | 100 | 100 |
| Cheat grass | 100 | 90 |
| Brome grass | 100 | 90 |
| Creeping fiscue | 100 | 95 |
| Crab grass | 100 | 100 |
| Foxtail | 100 | 99 |
| Johnson grass | 100 | 99 |
| Kentucky bluegrass | 100 | 99 |
| Orchard grass | 100 | 99 |
| Red top | 100 | 100 |
| Reed canary grass | 100 | 100 |
| Rye grass | 100 | 95 |
| Sudan grass | 95 | 98 |
| Timothy | 90 | 30 |
| Oats | 95 | 90 |
| Rice | 100 | 100 |
| Sorghum | 100 | 90 |
| Spring wheat | 100 | 95 |
| Barley | 98 | 95 |
| Wheat | 95 | 95 |
| Corn | 95 | 80 |
| Wild Oats | 95 | 90 |

At the time of the observations, abundant and vigorously growing stands of the named plant species were found in the untreated checks.

Example 5

Twenty-five parts by weight of 2,2-dichlorobutyric acid, 65 parts of xylene, and 5 parts of an alkylated aryl polyether alcohol (Triton X–100) are mechanically mixed together to prepare a concentrate composition in the form of an emulsifiable liquid.

Also, 25 parts by weight of sodium 2,2-dichlorobutyrate are mechanically mixed with four parts of Triton X–100 to prepare a water dispersible concentrate composition.

In a further operation, 25 parts by weight of sodium 2,2-dichlorobutyrate, 70 parts of fuller's earth, 3 parts of an alkyl aryl sulfonate (Nacconol NR) and 2 parts of a polymerized sodium salt of substituted benzoid alkyl sulfonic acid (Daxad No. 27) are mechanically mixed and ground together to prepare a concentrate composition in the form of a wettable powder.

These concentrate compositions are adapted to be dispersed in water to prepare aqueous compositions which have very desirable wetting and penetrating properties. The latter aqueous compositions are adapted to be employed to distribute growth inhibiting dosages of the toxicant compounds in soil or upon the above ground surfaces of plants.

Example 6

Sodium 2,2-dichlorobutyrate was dissolved in water to prepare aqueous spray compositions containing ten and five pounds of the butyrate compound per 40 gallons of ultimate mixture. An amount of Triton X-100 equal to 0.3 gram per liter of spray solution was added to the spray mixtures and portions of the resulting compositions thereafter applied to the foliage of seedling stands of crab grass, cheat grass, wild oats, pig weed, wild mustard, Japanese millet, radish, tomato and corn which were from two to six inches tall. In the treating operations, the compositions were applied with conventional spray equipment at 40 pounds per square inch and at a dosage of 40 gallons per acre. Other stands of the named plant species were left untreated to serve as checks. Seventeen days following the application the stands were examined to ascertain the percent control of the various plant species. The results are set forth in the following table.

| Plant Species | Dosage of Dichlorobutyrate Compound in Pounds per Acre | Percent Control |
| --- | --- | --- |
| Crab grass | 10 | 80 |
|  | 5 | 80 |
| Cheat grass | 10 | 90 |
|  | 5 | 90 |
| Wild oats | 10 | 90 |
|  | 5 | 80 |
| Pigweed | 10 | 100 |
|  | 5 | 100 |
| Wild mustard | 10 | 100 |
|  | 5 | 100 |
| Japanese millet | 10 | 95 |
|  | 5 | 90 |
| Radish | 10 | 100 |
|  | 5 | 100 |
| Tomatoes | 10 | 100 |
|  | 5 | 100 |
| Corn | 10 | 90 |
|  | 5 | 90 |

At the time of observation, there was found luxuriant and vigorously growing stands in the untreated checks.

Example 7

One mole of 2,2-dichlorobutyric acid is dissolved in 17.45 liters of water and one mole potassium carbonate added thereto with stirring. The potassium carbonate dissolved with evolution of carbondioxide. The resulting solution of potassium 2,2-dichlorobutyrate contained one percent by weight acid equivalent of 2,2-dichlorobutyric acid.

In a similar fashion, chemically equivalent proportions of ammonia, cupric carbonate, magnesium carbonate, zinc carbonate, monomethylamine, diethylamine, triethylamine, diisopropylamine, tri-n-butylamine, monoethanolamine, diethanolamine, triethanolamine, monoethanol, diisopropanolamine, diethanol, monoisopropanolamine and ethylenediamine were added with stirring to separate aqueous solutions of 2,2-dichlorobutyric acid to prepare the respective ammonium cupric, magnesium, zinc, monomethylammonium, diethylammonium, triethylammonium, diisopropylammonium, tri-n-butylammonium, monoethanolammonium, diethanolammonium, triethanolammonium, monoethanol, diisopropanolammonium, diethanol, monoisopropylammonium and ethylene diamine salts of 2,2-dichlorobutyric acid. In preparing the zinc, magnesium and cupric salts, the mixtures are heated from 60° to 95° C. for a period of time with stirring to assure completion of the reaction.

Each of the above salt solutions is dispersed in water to prepare herbicide compositions containing 0.5 pound acid equivalent of one of the salts per 100 gallons of solution. These compositions are applied as a soil drench to areas of soil which have been prepared and seeded to crab grass. The applications are made in an amount sufficient to supply a substantially uniform dosage of 50 pounds acid equivalent of one of the salts per acre. Similarly seeded soil areas are left untreated to serve as checks. After three weeks a 100 percent control of the growth of germinant seeds and emerging seedlings is found in all treated areas with substantially complete germination of crab grass in the check areas.

The term "plant part" as employed in the present specification and claims is intended to be inclusive of the stems, branches, roots, foliage and germinant seeds of plants.

The expressions "growth media and soil" are herein employed in their broadest sense to be inclusive of all conventional "soils" as defined in Webster's New International Dictionary, Second Edition, Unabridged, published in 1937 by G. and C. Merriam Company, Springfield, Massachusetts. Thus, the terms refer to any substance or media in which vegetation may take root and grow, and are intended to include not only earth but compost, manure, muck, humus, and sand and the like, adapted to support plant growth.

I claim:

1. A method which comprises exposing growing plants and plant parts to the action of a growth inhibiting amount of a compound selected from the group consisting of 2,2-dichlorobutyric acid and its salts.

2. An agronomical practice which comprises impregnating soil with a growth inhibiting amount of a compound selected from the group consisting of 2,2-dichlorobutyric acid and its salts.

3. A method which comprises applying to growing plants and plant parts a growth suppressing amount of a composition comprising an active toxic ingredient in admixture with a herbicide adjuvant as a carrier therefor, the active ingredient being selected from the group consisting of 2,2-dichlorobutyric acid and its salts.

4. A method which comprises applying 2,2-dichlorobutyric acid to growing plants and plant parts at a substantial uniform dosage of at least one pound per acre.

5. A method which comprises applying sodium 2,2-dichlorobutyrate to growing plants and plant parts at a substantial uniform dosage of at least one pound acid equivalent per acre.

6. A method which comprises applying a water soluble salt of 2,2-dichlorobutyric acid to growing plants and plant parts at a substantial uniform dosage of at least one pound acid equivalent per acre.

7. A herbicide composition which comprises a liquid petroleum distillate and dispersed therein a compound selected from the group consisting of 2,2-dichlorobutyric acid and its salts, the butyric acid compound being present in the amount of from 5 to 95 percent by weight.

8. A concentrate composition comprising an active ingredient in intimate admixture with a surface active dispersing agent, the active ingredient being selected from the group consisting of 2,2-dichlorobutyric acid and its salts and being present in the amount of from 5 to 95 percent by weight.

9. A concentrate composition comprising an active ingredient in intimate admixture with an inert finely divided solid, the active ingredient being selected from the group consisting of 2,2-dichlorobutyric acid and its salts and being present in the amount of from 5 to 95 percent by weight.

10. A method which comprises applying to growing plants and plant parts a growth suppressing amount of a composition comprising an active toxic ingredient in admixture with a surface active dispersing agent as a carrier therefor, the active ingredient being selected from the group consisting of 2,2-dichlorobutyric acid and its salts.

11. A method which comprises applying to growing plants and plant parts a growth suppressing amount of a composition comprising an active toxic ingredient in admixture with an inert finely divided solid as a carrier therefor, the active toxic ingredient being selected from the group consisting of 2,2-dichlorobutyric acid and its salts.

References Cited in the file of this patent

UNITED STATES PATENTS 2,642,354   Barrons _____ June 16, 1953

OTHER REFERENCES

Kronberger et al., in "Chemical Abstracts," 1941, vol. 35, col. 4805(7).

Berezova, in "Chemical Abstracts," 1941, vol. 35, col. 7093(1).

Gellerman, in "Chemical Abstracts," 1951, vol. 45, col. 719(a).

Onodera, in "Chemical Abstracts," 1917, vol. II, col. 3047(3).